United States Patent [19]

Duncan

[11] 4,064,001

[45] Dec. 20, 1977

[54] HOT LEG RELIEF SYSTEM

[75] Inventor: Richard Joseph Duncan, Niantic, Conn.

[73] Assignee: Combustion Engineering, Inc., Windsor, Conn.

[21] Appl. No.: 573,665

[22] Filed: May 1, 1975

[51] Int. Cl.² .............................................. G21C 9/00
[52] U.S. Cl. ........................................ 176/38; 176/60; 176/65
[58] Field of Search ...................... 176/37, 38, 60, 65

[56] References Cited

U.S. PATENT DOCUMENTS

| 3,417,815 | 12/1968 | Van den Honert | 165/107 |
|---|---|---|---|
| 3,437,557 | 4/1969 | Kaipainen et al. | 176/20 |
| 3,528,884 | 9/1970 | Collier et al. | 176/37 |
| 3,734,823 | 5/1973 | Brown | 176/26 |
| 3,788,944 | 1/1974 | Stracke et al. | 176/60 |
| 3,834,987 | 9/1974 | Cook et al. | 176/59 |

OTHER PUBLICATIONS

"Steam Generation", Power, 4/70 pp. 90-91.

Primary Examiner—Samuel W. Engle
Assistant Examiner—Ralph Palo
Attorney, Agent, or Firm—Stephen L. Borst; Richard H. Berneike

[57] ABSTRACT

A system is provided for the relief of excess pressure from the hot leg of a nuclear reactor to the cold leg on the occurrence of a loss of coolant accident. This system includes a conduit connecting the hot leg with the cold leg. The conduit further includes a check valve which is operated on the basis of differential pressure so that during normal operation the valve is closed.

4 Claims, 3 Drawing Figures

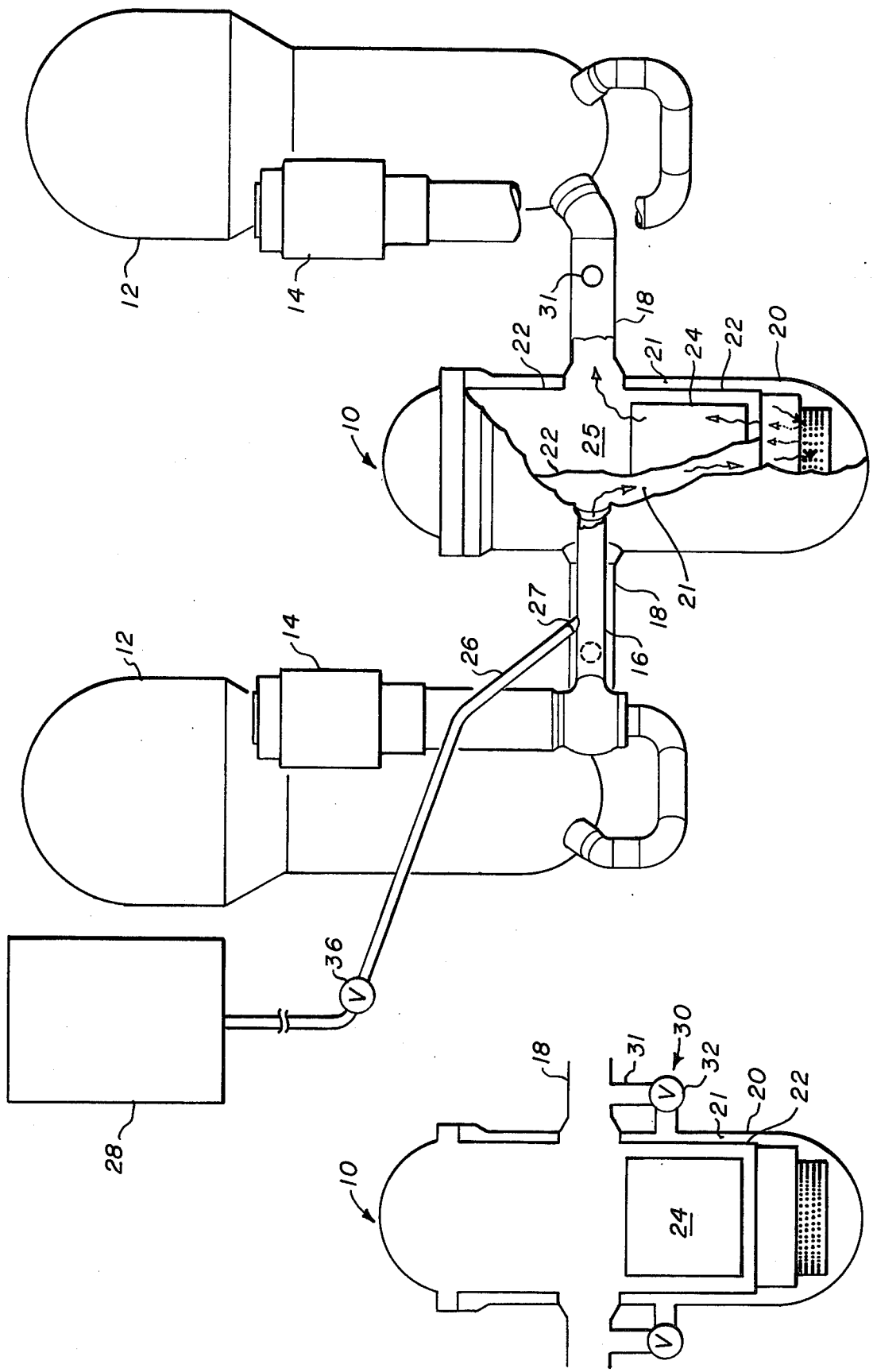

HOT LEG RELIEF SYSTEM

BACKGROUND OF THE INVENTION

This invention relates to fluid cooled nuclear reactors and means for minimizing the effect of loss of coolant through a cold leg break.

In the event of an accident in which there is a break in the cold leg of the reactor coolant system, it has been postulated that the entire coolant medium which absorbs and removes the heat generated in the nuclear core will be lost or at least considerably decreased. Although control elements are inserted into the core to terminate the core's fission process upon the occurrence of such an accident, decay heat generated by the already formed fission products is capable of causing fuel or clad melting if sufficient emergency cooling of the fuel is not immediately accomplished. Furthermore, the overheating of the fuel cladding can result in a severe adverse chemical reaction in the reactor core, which may not be reversed by later cooling procedures. Accordingly, it is necessary to provide a sufficient coolant flow immediately after the accident to ensure that this heating of fuel and cladding is kept within acceptable limits.

Many prior art systems have been developed to inject emergency core coolant water into the reactor pressure vessel when such an accident occurs. If the emergency core coolant water does not reach the reactor core within the first minute following the accident, the entire reactor core, fuel and supporting structure begins to melt down and slump to the bottom of the reactor vessel. Emergency cooling water injected at this stage may well amplify the disaster as the now molten metals can react violently with water, generating large quantities of heat, releasing steam and hydrogen in amounts and at pressures that can themselves breach the containment. If the containment vessels themselves do not burst, it has been postulated that the molten mass of fuel would continue to melt downward, fed by the heat generated by fission product radioactivity.

It is the function of emergency core cooling system to resupply the core within this first minute with coolant water in the event of the loss of primary coolant in a loss of coolant accident. The emergency core coolant water is normally injected into the inlet nozzles of the reactor and allowed to flow downwardly along the normal coolant path to the bottom of the vessel and then upwardly to the reactor core. A possible difficulty with this method of injecting emergency core coolant into the reactor is that large quantities of steam are generated by the hot core which creates a pressure buildup in the core and the reactor outlet plenum. This buildup of pressure not only impedes the further coolant from reaching the core but also may displace the water already in the core downwardly out of the core. This excess pressure also creates a further problem in that in the ordinary nuclear steam supply system, the pressure buildup has only two paths for its relief. If a break occurs in the cold leg between the reactor vessel and the coolant pump causing the loss of coolant accident, then the first path for pressure relief is down through the middle of the reactor core and up through the outer annulus between the core support barrel and the pressure vessel walls and out through the cold leg to the break. This flow is opposite to the flow of the emergency core cooling water being injected into that leg thereby impeding the flooding of the reactor core from the bottom. The second path for pressure relief is from the plenum above the reactor core out through the hot leg to the steam generator, through the steam generator and through the coolant pump to the cold leg break where the steam is discharged to the atmosphere. The steam that flows through this path is being driven by the pressure differential between the high pressure in the reactor plenum above the core and atmospheric pressure. Consequently, the steam flow rate is very high and the steam tends to drive the reactor pump like a turbine. This circumstance produces the substantial danger of over speeding the reactor coolant pump to the point where the massive fly-wheel connected to the reactor coolant pump shaft disintegrates and eventually would cause severe damage to the surrounding equipment. It is to the solution of these problems that the present invention is directed.

One prior art solution to these problems is disclosed in the April, 1970 issue of "Power Magazine" on pages 90–91. This prior art solution consists of the incorporation of a plurality of swing check valves in the core support shield between the plenum over the reactor core and the outer annulus between the core support shield and the reactor pressure vessel. These valves operate to equalize the pressure differential between the reactor's upper plenum and the annulus by swinging open on the occurrence of a very low differential pressure and thereby allowing the generated steam to flow directly from the reactor to the annulus and out through the cold leg rupture. These valves, however, have the difficulty that they are mounted on the interior of the reactor pressure vessel and are consequently inaccessible for routine maintenance and necessarily become highly radioactive. They also have the further difficulty that failure of one of these valves would substantially impair the operation of the nuclear reactor power system. Furthmore, if a physical breakdown of one of these valves were to occur, the failure may cause a loose part to be released to the incoming coolant water flow. The loose part could then possibly be swept into a flow blocking position which could cause unnecessary overheating of the reactor fuel elements, or would turbulently clatter around in the lower plenum, destroying or severely damaging critical elements that may be positioned in the lower plenum.

SUMMARY OF THE INVENTION

According to the present invention, there is provided an emergency pressure relief system for use in a reactor system which has a hot leg and a cold leg external to the reactor pressure vessel. The reactor hot leg relief system consists of a pipe connecting the hot leg and the cold leg of the reactor system with a check valve therein. The check valve is built to pass fluid only when the pressure in the hot leg exceeds the pressure in the cold leg. With such an arrangement, the excess pressure generated above the reactor core on the occurrence of a loss of coolant accident by the rupture of a cold leg is vented to that cold leg and out of the rupture to the reactor containment atmosphere. Accordingly, as a result of the relief of the pressure, the emergency core coolant systems can adequately respond to refill the reactor pressure vessel so that the reactor core is cooled and prevented from melting.

BRIEF DESCRIPTION OF THE DRAWINGS

FIG. 2 is a review of FIG. 1 along lines A—A.

FIG. 3 is an alternate arrangement for the hot leg relief system.

DESCRIPTION OF THE PREFERRED EMBODIMENT

Figure 1:
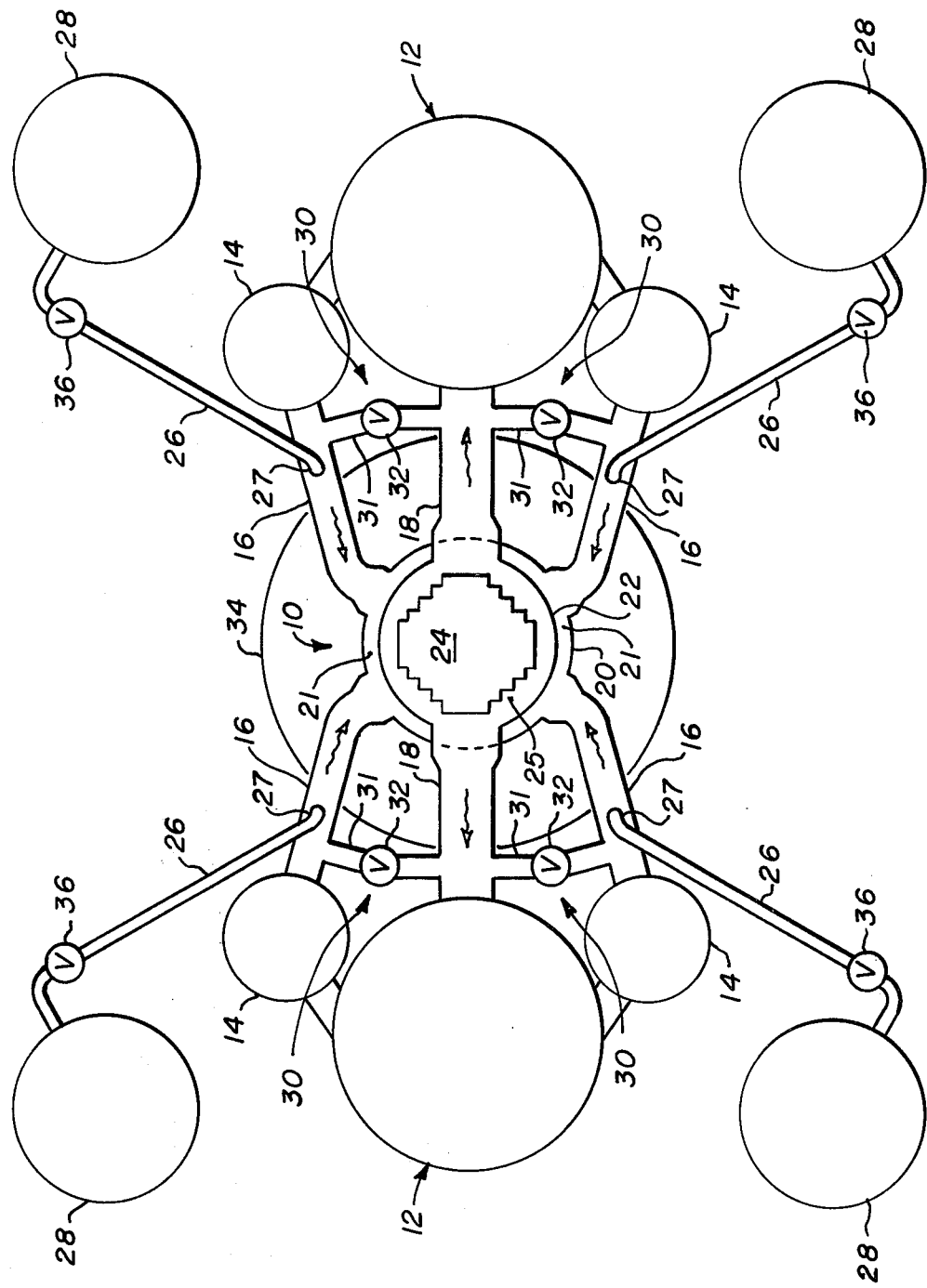
FIG. 1 is a plan view of the reactor coolant system arrangement.

Referring now to FIG. 1, there is shown a nuclear reactor 10 including a nuclear reactor pressure vessel 20 surrounded by biological shielding 34 and having an active core or fuel region 24 therein. Core 24 is supported in the reactor pressure vessel 20 in a well-known manner by core support barrel 22 which is suspended from a pressure vessel flange (not shown). The reactor coolant is circulated through the cold leg 16 by the reactor coolant pump 14. As best seen in FIG. 2, the cold coolant enters the reactor pressure vessel 20 and impinges upon the core support barrel 22. The flow of the coolant is then deflected downwardly to pass through the annular region 21 between the core support barrel 22 and the reactor pressure vessel 20 to the lower portions of the reactor pressure vessel where it is deflected upwardly to pass to the interior of the reactor core support barrel. Once on the interior of the reactor core support barrel, the coolant flows upwardly through the fuel assemblies (not shown) of the reactor core 24 and subsequently passes into the reactor plenum 25 immediately above the reactor core 24. From here the coolant is again deflected to pass out of the reactor pressure vessel 20 and into hot leg 18 by which means it is delivered to steam generator 12. During its passage through the steam generator 12, the coolant is cooled in a well-known manner by transferring its heat content to the secondary coolant system. After being cooled in the steam generator 12, the primary coolant is recirculated by the reactor coolant pump 14 and the cycle is repeated.

Also shown in FIGS. 1 and 2 is a portion of the emergency core cooling system which includes storage tank 28 check valve 36 and delivery pipe 26. Storage tank 28 contains a large quantity of highly borated water. Check valve 36 is designed to permit the passage of the borated water contained in tank 28 to the primary coolant system by means of pipe 26 when the pressure in the primary coolant system drops below a predetermined pressure. Such a pressure drop occurs with a loss of coolant accident or LOCA. The borated water is then obliquely injected into the primary coolant system at penetration 27 in the cold leg 16. This borated emergency coolant is injected under a high pressure so that the coolant is caused to flow through the cold leg 16 into the reactor vessel 20, and down through the annulus 21 between the reactor vessel 20 and the core support barrel 22 to reflood the reactor core 24 from the bottom. As discussed above, this injection and reflooding technique is impeded if a substantial steam pressure is permitted to exist in the reactor plenum 25 above the reactor core 24.

Accordingly, steam relief means 30 are provided to relieve the steam pressure from the reactor plenum 25. Steam relief means 30, which is external to the reactor vessel 20, is connected between the cold leg 16 (fluid coolant delivering means) and the hot leg 18 (fluid coolant removing means) for the purpose of relieving the excess pressure in the hot leg when the pressure in the cold leg exceeds the pressure in the cold leg. For the purposes of this disclosure, the "fluid coolant delivering means" shall include not only the hot leg pipe 16 but also that portion of reactor vessel 20 and the core support barrel 22 which forms the annular region 21 between the reactor pressure vessel 20 and the reactor core support barrel 22. Accordingly, an alternative embodiment of the present invention is illustrated in FIG. 3 in which the external reactor pressure relief means includes a pipe 31' connecting the hot leg 18 to the annular region 21 between the reactor pressure vessel 20 and the reactor core support barrel 22 by means of a penetration through the reactor pressure vessel 20. In all cases, the external reactor pressure relief means 30 includes a valve 32 which is responsive to the different pressure existing between the fluid coolant delivering means and the fluid coolant removing means. Valve 32 may consist of a conventional commercially available check valve, the particular construction of which does not form a part of the present invention.

What is claimed is:

1. An improved pressurized water reactor system having a water cooled reactor core contained within a reactor vessel, means for delivering the water coolant to the reactor core including a coolant pump and means for removing the water coolant from the reactor core, the improvement comprising:
    a. differential pressure responsive means external to said reactor vessel including a valve connected between said water coolant delivering means downstream of said coolant pump and said water coolant removing means for relieving excess pressure in said water coolant removing means when the pressure in said water coolant removing means exceeds the pressure downstream of said coolant pump in said water collant delivering means.

2. The improvement as recited in claim 1 wherein said excess pressure relieving means includes a pipe and a valve responsive to the differential pressure between said water coolant removing means and said fluid coolant delivering means.

3. The improvement as recited in claim 2 wherein said valve is a differential pressure actuated check valve.

4. The improvement as recited in claim 2 wherein said nuclear reactor power system includes a steam generator and wherein said water coolant removing means includes a pipe connecting said reactor vessel to the inlet side of the said steam generator and wherein said water coolant delivering means includes a pipe connecting said reactor vessel and the outlet side of said steam generator, said water coolant delivering pipe having a reactor coolant pump intermediate its two ends.

* * * * *